Aug. 14, 1956 R. PETH 2,759,103

OSCILLATOR CIRCUIT

Filed Dec. 18, 1952

INVENTOR.
Robert Peth

BY Norman L. Mueller

Atty.

2,759,103

OSCILLATOR CIRCUIT

Robert Peth, Chicago, Ill., assignor to Motorola, Inc., Chicago, Ill., a corporation of Illinois Application December 18, 1952, Serial No. 326,660
6 Claims. (Cl. 250—36)

Figure 4:
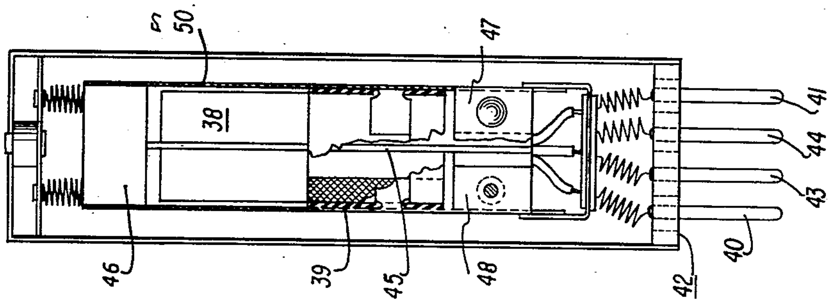

This invention relates generally to oscillators, and more particularly to a low frequency oscillator system which includes an electro-mechanical magnetic vibrating reed structure for controlling the frequency of an oscillator and for maintaining such frequency at a selected value within narrowly defined limits.

Low frequency oscillators which produce tones in the audible range have many applications such as, for example, in electronic musical instruments and in selective signalling systems. Although in some applications the requirements for precise frequencies may not be too severe, in others it is required that the oscillator frequency be rigidly maintained within narrowly defined limits. This is the case in selective calling systems presently used in mobile communication equipment wherein it is desired that a large number of possible calls may be made within a limited frequency range. In order to accomplish this purpose satisfactorily, the tone oscillators used in such equipment must be highly accurate and each have an individual frequency that is precisely maintained so that closely adjacent frequencies can be used for calling different stations without interference with each other.

Although various means, such as crystals, have been provided for stabilizing oscillators and maintaining their frequencies at fixed values, these means have proved to be impractical for low frequency operation. Moreover, crystal stabilized oscillators are relatively complicated and expensive and, since a number of oscillators (each with a distinctive frequency) is required in a plural station selective calling system, the use of crystal oscillators would add greatly to the overall costs and complication of the system. For the above reasons, it has been the practice to use what has been termed "vibrating reed" structures for stabilizing low frequency oscillators in selective calling systems. The present invention provides an improved oscillator that uses such a structure. The structure used in the oscillator of the invention includes a vibrating reed of magnetizable material which is secured at one end and extends through an inductance coil. The reed is arranged to vibrate freely between a pair of permanent magnets of opposite polarity arranged adjacent its free end. This causes the inductance coil to exhibit certain characteristics at a signal frequency corresponding to the natural frequency of vibration of the reed, and these characteristics are utilized to determine the oscillator frequency.

It is, therefore, an object of the present invention to provide an improved low frequency oscillator whose frequency is accurately controlled and maintained within narrow limits at a predetermined value.

A further and more specific object of the invention is to provide an improved low frequency oscillator which includes a vibrating reed structure precisely to maintain its frequency at a predetermined value, and which is constructed in a new and improved manner to use relatively few and simple component parts and relatively uncomplicated associated circuitry.

Yet another object of the invention is to provide an improved low frequency oscillator that utilizes a vibrating reed structure in its feedback circuit, and which is constructed to operate at different frequencies within a selected range merely by replacing the reed structure and without the need for substantial alterations of the circuit parameters of the oscillator.

A feature of the invention is the provision of a low frequency oscillator in which feed-back at the proper amplitude and phase to sustain oscillation is provided through a vibrating reed filter utilizing but a single inductance coil.

Another feature of the invention is the provision of a low frequency oscillator that utilizes a vibrating reed structure in its regenerative feedback path, and which further includes a frequency selective degenerative feedback path to inhibit oscillation at frequencies other than the natural frequency of the vibrating reed structure and to maintain substantially constant signal amplitudes within an operating range.

Yet another feature of the invention is the provision of a low frequency oscillator incorporating a vibrating reed structure in its feedback path, and which includes a gain control circuit further to maintain substantially constant signal amplitudes within the operating range of the oscillator.

Figure 3:
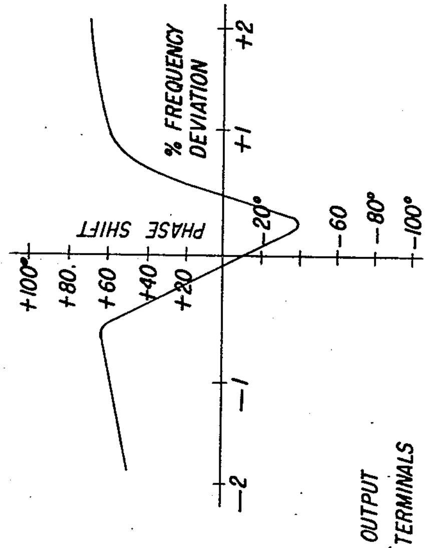
Figure 2:
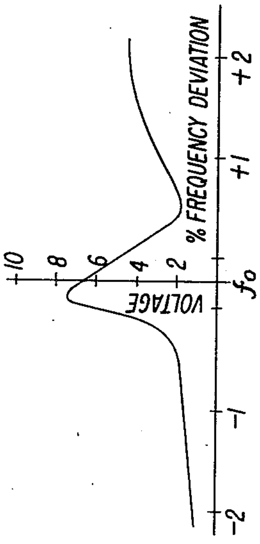
Figure 1:
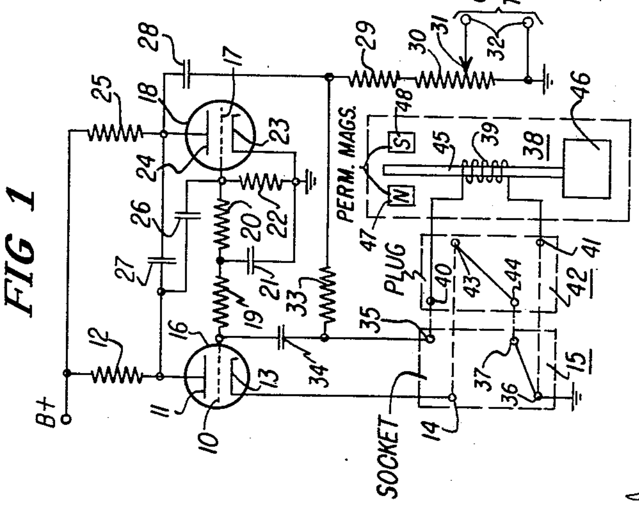

The above and other features of the invention which are believed to be new are set forth with particularity in the appended claims. The invention itself, however, together with further objects and advantages thereof may best be understood by reference to the following description when taken in conjunction with the accompanying drawing in which:

Fig. 1 is a schematic representation of a low frequency oscillator constructed in accordance with the invention, Figs. 2 and 3 are characteristic curves of a vibrating reed structure incorporated in the regenerative feedback circuit of the oscillator of Fig. 1, and Fig. 4 shows the mechanical details of a suitable vibrating reed structure that may be connected into the oscillator of Fig. 1.

The oscillator circuit of Fig. 1 includes an electron discharge device 10 having an anode 11 connected to the positive terminal B+ of a source of unidirectional potential through a load resistor 12. The device also has a cathode 13 which is connected to a contact 14 on a socket 15. Device 10 has a control electrode 16 which is connected to the control electrode 17 of a second electron discharge device 18 through a pair of series-connected resistors 19 and 20. The junction of resistors 19 and 20 is bypassed to ground for signal frequencies through a capacitor 21, and the control electrode 17 is connected to ground through a grid-leak resistor 22. Device 18 has a cathode 23 which is connected directly to ground, and also has an anode 24 connected to the positive terminal B+ through a load resistor 25. Anode 11 of device 10 is coupled to control electrode 17 of device 18 through a coupling capacitor 26, and anode 24 of device 18 is coupled to anode 11 through a degenerative feed-back capacitor 27.

Anode 24 of device 18 is coupled to ground through a series-connected capacitor 28 and resistors 29 and 30. Resistor 30 has a variable tap 31 associated therewith which is connected to one of the output terminals 32, the other output terminal being connected to ground. The junction of capacitor 28 and resistor 29 is coupled to control electrode 16 through a series-connected resistor 33 and capacitor 34. The junction of resistor 33 and capacitor 34 is connected to a contact 35 of socket 15, which also has a contact 36 connected to ground and a further contact 37 connected to contact 36.

The oscillator circuit includes an electro-mechanical vibrating reed structure 38, shown schematically in Fig. 1. The structure includes an inductance coil 39 which is connected to contacts 40 and 41 of a plug designated generally as 42. Plug 42 may be inserted in socket 15 so that contact 40 connects with contact 35, contact 41 connects with contact 36, contact 43 with contact 14, and contact 44 with contact 37. Structure 38 also includes a reed 45 of magnetizable material which is rigidly mounted at one end on a base 46 and allowed freely to vibrate between a pair of permanent magnets 47 and 48, magnet 47 exhibiting a north pole to the reed and magnet 48 exhibiting a south pole.

The mechanical details of the vibrating reed structure 38 are shown in Fig. 4, and the structure may be generally similar to that disclosed and claimed in co-pending application Serial No. 179,114 filed August 14, 1950, in the name of Holzinger et al., which issued August 31, 1954, as Patent No. 2,688,059 and which is entitled Electro-Mechanical Device, and assigned to the present assignee. The structure includes the base member 46, and vibrating reed 45 of magnetizable material. The vibrating reed is rigidly secured to the base and, generally speaking, has considerably less mass than the base. The reed 45 and base 46 are positioned in a sheet metal housing 50 of rectangular construction, with the vibrating reed 45 extending along the longitudinal axis of the housing. Housing 50 also contains a permanent magnet having a north magnetic pole 47 positioned on one side of the free end of reed 12, and a south magnetic pole 48 positioned on the opposite side of the reed. Physically disposed adjacent the magnetic poles, and surrounding reed 45, is the coil winding 39 which, as previously mentioned, is connected to contacts 40 and 41 on plug 42, contacts 43 and 44 being connected together. Further details of the structure of Fig. 4 are fully disclosed in the co-pending application referred to previously herein.

When an alternating current signal is applied to coil 39, a varying magnetic field is produced around the coil in accordance with the principles of electro-magnetism. This field passes along reed 45 and either adds to, or subtracts from, the field produced by the magnetic poles 47 and 48, depending upon which half-cycle the signal applied to coil 39 is passing through. As previously stated, reed 12 is constructed of magnetizable material and is normally positioned midway between poles 47 and 48. During one half-cycle of the applied signal, the combined field of magnetic poles 47 and 48 and coil 39 causes the end of reed 45 to be pulled to one side, and upon the applied signal passing through the next succeeding half-cycle, opposition of the two fields allows the reed to flex back to its normal position.

When the signal applied to coil 39 is of the same frequency as the resonant frequency of vibration of reed 45, the varying magnetic field thus produced will cause the reed to vibrate at its resonant frequency. Reed 45 vibrates at maximum amplitude at this frequency and imparts certain characteristics to the inductance coil 39. For example, as shown in Fig. 2, when the current flow through coil 39 is substantially at the resonant frequency $F_0$ of reed 45, essentially maximum voltage is developed across the coil, and this voltage drops rapidly as the frequency of the signal varies in either direction from the resonant frequency $F_0$. Moreover, as shown in Fig. 3, the phase shift of the voltage appearing across coil 39 is essentially zero at the resonant frequency $F_0$, but quickly shifts as the frequency deviates therefrom. These characteristics of the vibrating reed structure are utilized in the circuit of Fig. 1 to establish the oscillator frequency and maintain it between narrowly defined limits.

Adverting once again to Fig. 1, any signals developed by device 10 are impressed on the control electrode 17 of device 18 through capacitor 26 and are amplified and inverted in phase by the latter device. The inverted, amplified signals appear across output terminals 32 with an amplitude determined by the setting of tap 31 on resistor 30. A portion of the output signal from device 18 is fed back to control electrode 16 of device 10 by means of the network 33, 34 and 39, inductance coil 39 being connected between the junction of resistor 33 and capacitor 34 and ground.

Due to the characteristics of structure 38, as illustrated in Figs. 2 and 3, all signals other than the signal corresponding to the vibrating frequency of reed 45 are attenuated by the inductance coil 39 and produce a relatively small potential across the inductance coil and, moreover, the potentials so produced have the wrong phase to sustain oscillations. However, the output signal corresponding to the natural frequency of vibrating reed 45 causes a relatively high in-phase potential to appear across inductance coil 39 and, therefore between control electrode 16 and ground, so that a feed-back signal is impressed on device 10 that is substantially in phase with the output signal. In this fashion, the signal developed by device 10 corresponding to the natural frequency of the reed is phase inverted by device 18 and fed back to the control electrode 16 of device 10 with inverted phase to sustain oscillation. Magnetic structure 38, therefore, serves to determine the frequency of the oscillator and to maintain that frequency within relatively narrow limits. This obtains since any signal, other than that corresponding to the natural frequency of reed 45, which is fed back by the network 33, 34 and 39, not only appears with reduced amplitude across inductance coil 39, but is also phase shifted so as to be incapable of sustaining oscillations.

Capacitor 27 is connected to constitute a frequency selective degenerative feedback path to inhibit oscillation of the system at harmonic modes of the reed structure utilized therein. These harmonic modes have appreciable amplitude at the sixth and higher harmonics, and the value of capacitor 27 is so chosen that no appreciable degeneration occurs at the fundamental frequency of the reed but high degeneration occurs at the sixth and higher harmonics. In this manner the oscillator oscillates at the fundamental frequency of the reed, but oscillation at the higher harmonics thereof is prevented.

Capacitor 27 may remain unchanged as various reed structures are plugged into the circuit to produce different frequencies of oscillation in a selected frequency range, the capacitor in each instance producing degeneration to the higher harmonics of such reeds. However, when the selected frequency range is extended, it is desirable to vary the value of capacitor 27 slightly for some of the reed structures to maintain the output signal at a desired amplitude.

To assist further in maintaining the output signal substantially constant for the various frequencies as different reed structures are plugged into the circuit, the circuit is so arranged that device 18 further functions as an automatic gain control. This is achieved by the provision of network 19, 20 and 21 between the control electrode 16 of device 10 and control electrode 17 of device 18. Capacitor 21 bypasses the feed-back signals, so that only shifts in bias of control electrode 16 due to well-known grid leak action are reflected on control electrode 17 to vary its bias. Device 18 may be of the variable mu type so that any variation in operating bias also varies the gain thereof. In this fashion, should the feed-back voltage tend to decrease, the bias of control electrode 17 is decreased due to grid leak action and the gain of device 18 is correspondingly increased. In this fashion, a substantially constant output signal is maintained across terminals 32 for all selected frequencies within the aforementioned frequency range.

As previously noted, it is desirable to provide a plurality of structures 38 each having a reed whose natural vibrating frequency is at a different frequency within a selected frequency range. These various reed frequencies are obtained by providing different magnetic reeds 45 in each unit. In order to decrease cost, the reeds may in the first instance all have substantially the same physical dimensions, and different frequency characteristics may be imparted to different reeds by notching a portion thereof in the proximity of base 46. For example, in the 50 to 136 cycle range, the reeds may all be two inches long, 70/1000 thick, and 1/8 inch wide, with necks of decreased widths formed 13/16 inch from the base for various selected frequencies within this range. In the 136 to 346 cycle range, the reeds may be two inches long, 40/1000 thick, and 1/8 inch wide, with the various necks also formed 13/16 inch from the base. Finally, in the 346 to 1084 frequency range, the reeds may be 1 1/8 inches long, 40/1000 of an inch thick, and 1/8 inch wide, with the necks 3/32 inch from the base. The above values, of course, are given merely by way of example. The reeds themselves may be formed of iron or other magnetizable material.

In a constructed embodiment of the invention, the following circuit parameters were used, and it was found that substantially constant output signals could be obtained from terminals 32 throughout the 50–1084 cycle range without the need of any changes except for a slight adjustment of capacitor 27. These parameters are listed herein merely by way of example:

| | |
|---|---|
| Devices 10 and 18 | 12AU7. |
| Resistor 12 | 330 K. |
| Resistor 25 | 120 K. |
| Capacitor 27 | 1000 micro-microfarads (for 100–325 cycles) and 500 micro-microfarads (for 325–1100 cycles). |
| Capacitor 26 | .02 microfarad. |
| Resistor 19 | 1.5 megs. |
| Resistor 20 | 1.5 megs. |
| Resistor 22 | 1.8 megs. |
| Capacitor 21 | .02 microfarad. |
| Capacitor 34 | .02 microfarad. |
| Resistor 33 | 330 K. |
| Capacitor 28 | .05 microfarad. |
| Resistor 29 | 150 K. |
| Resistor 30 | 100 K. |
| B+ | 150 volts. |

It is to be noted that socket 15 and plug 42 are connected so that when the plug is removed from the socket, the ground connection is removed from cathode 13. This prevents any energization or spurious oscillation of the oscillator when magnetic structure 38 is removed therefrom.

The invention provides, therefore, a relatively simple low frequency oscillator which incorporates a vibrating reed structure, and which develops output signals of substantially constant amplitude throughout a relatively wide frequency range merely by plugging in different vibrating reed structures. The oscillator may utilize a vibrating reed structure, such as that disclosed in the co-pending application referred to previously herein, that is not subject to vibration and which is hermetically sealed so that the operation and stability of the unit is unaffected by vibrations. These features of the structure enable the oscillator to be used conveniently in mobile applications, and also to be unaffected by weather conditions. Moreover, the improved oscillator of the invention is capable of developing selected frequencies, each precisely held between narrowly defined limits, which enables the oscillator to be used advantageously in selective calling systems having a plurality of stations within a relatively restricted frequency band.

While a particular embodiment of the invention has been shown and described, modifications may be made and it is intended in the appended claims to cover all such modifications as fall within the true spirit and scope of the invention.

I claim:

1. An oscillator including in combination, a first electron discharge device having an anode, a cathode and a control electrode, means for connecting said cathode to a point of reference potential, a second electron discharge device having an anode, a cathode and a control electrode, means for coupling said anode of said first device to said control electrode of said second device, means for connecting said cathode of said second device to said point of reference potential, a feedback network coupling said anode of said second device to said control electrode of said first device, an inductance coil included in said feedback network and connected to said point of reference potential to attenuate and shift the phase of signals applied to said control electrode of said first device by said feedback network, a reed of magnetizable material disposed in said inductance coil and having a resonant frequency of vibration, said reed having a supported end and a free end and a pair of opposite magnetic poles being disposed on opposite sides of said free end, whereby a signal in said feedback network having a frequency corresponding to said resonant frequency causes said reed to vibrate with maximum amplitude thereby reducing the attenuation characteristic of said coil to a minimum and the phase shift characteristic thereof to substantially zero for such a signal.

2. An oscillator according to claim 1 which further includes capacitor means coupled between the anodes of said first and second discharge devices to constitute a degenerative feedback path for harmonics of the signal corresponding in frequency to said resonant frequency of said reed.

3. An oscillator according to claim 1 which further includes a network extending from said control electrode of said first discharge device to said control electrode of said second discharge device to adjust the gain of said second device in response to amplitude variations of the signal impressed on said control electrode of said first device by said feedback network.

4. An oscillator for producing an output signal having a selected frequency including in combination, a discharge device having an input electrode, an output electrode and a common electrode, means for connecting said common electrode to a point of reference potential, an output circuit coupled to said output electrode for deriving an output signal therefrom, said output circuit including means for developing a feedback signal of proper phase to sustain oscillation at the frequency of said output signal, a feedback network coupling said developing means to said input electrode for applying the feedback signal to said input electrode with essentially zero phase shift, an inductance coil connecting said feed back network to said point of reference potential and a magnetically responsive mechanical vibratory body disposed in the field of said inductance coil and having a selected mechanical resonant frequency, said body vibrating with maximum amplitude at the resonant frequency to cause said feedback signal to have maximum amplitude and minimum phase shift across said inductance coil as compared with signals at other frequencies.

5. An oscillator for producing an output signal having a selected frequency including in combination, a discharge device having an input electrode, an output electrode and a common electrode, means for connecting said common electrode to a point of reference potential, an output circuit coupled to said output electrode for deriving the output signal therefrom, a phase-inverting circuit included in said output circuit for producing a feedback signal having the frequency of said output signal and in phase opposition to the signal appearing at said output electrode, a feedback network coupling said phase-inverting circuit to said input electrode for feeding the feedback signal to said input electrode with essentially zero phase shift, an inductance coil connecting said feedback network to said point of reference potential, and a magnetically-responsive mechanical vibratory body disposed in the field of said inductance coil and having a selected mechanical resonant frequency, said body vibrating with maximum amplitude at the resonant frequency to cause said feedback signal to have maximum amplitude and minimum phase shift across said coil as compared with signals at other frequencies.

6. An oscillator including in combination, a first electron discharge device having an anode, a cathode and a control electrode, means for connecting said cathode to a point of reference potential, a second electron discharge device having an anode, a cathode and a control electrode, means for coupling said anode of said first device to said control electrode of said second device, means for connecting said cathode of said second device to said point of reference potential, a feedback network coupling said anode of said second device to said control electrode of said first device for supplying a feedback signal to said last-named control electrode, an inductance coil connecting said feedback network to said point of reference potential, and a magnetically-responsive mechanical vibratory body disposed in the field of said inductance coil and having a mechanical resonant frequency corresponding to a selected frequency, said body vibrating with maximum amplitude at said selected frequency and causing said feedback signal to have maximum amplitude and minimum phase shift across said inductance coil at a frequency corresponding essentially to said selected frequency.

References Cited in the file of this patent

UNITED STATES PATENTS

| | | |
|---|---|---|
| 2,396,224 | Artzt | Mar. 12, 1946 |
| 2,478,330 | Shonnard | Aug. 9, 1949 |
| 2,547,027 | Winkler | Apr. 3, 1951 |
| 2,583,542 | Bostwick | Jan. 29, 1952 |